United States Patent
Fong et al.

(10) Patent No.: US 11,292,927 B2
(45) Date of Patent: Apr. 5, 2022

(54) INKS COMPRISING LIQUID RUBBER FOR 3D PRINTING

(71) Applicant: 3D Systems, Inc., Rock Hill, SC (US)

(72) Inventors: John Wai Fong, Temple City, CA (US); Patricia Wang, Lake Oswego, OR (US)

(73) Assignee: 3D SYSTEMS, INCORPORATED, Rock Hill, SC (US)

( * ) Notice: Subject to any disclaimer, the term of this patent is extended or adjusted under 35 U.S.C. 154(b) by 459 days.

(21) Appl. No.: 16/124,618

(22) Filed: Sep. 7, 2018

(65) Prior Publication Data

US 2019/0002713 A1   Jan. 3, 2019

Related U.S. Application Data

(63) Continuation of application No. 14/949,148, filed on Nov. 23, 2015, now abandoned.

(60) Provisional application No. 62/159,509, filed on May 11, 2015, provisional application No. 62/083,509, filed on Nov. 24, 2014.

(51) Int. Cl.
| | | |
|---|---|---|
| *C09D 11/101* | (2014.01) | |
| *C09D 11/30* | (2014.01) | |
| *B29C 64/112* | (2017.01) | |
| *B33Y 10/00* | (2015.01) | |
| *B33Y 70/00* | (2020.01) | |
| *B33Y 80/00* | (2015.01) | |
| *B29K 75/00* | (2006.01) | |

(52) U.S. Cl.
CPC .......... *C09D 11/101* (2013.01); *B29C 64/112* (2017.08); *C09D 11/30* (2013.01); *B29K 2075/00* (2013.01); *B29K 2995/007* (2013.01); *B29K 2995/0081* (2013.01); *B29K 2995/0082* (2013.01); *B33Y 10/00* (2014.12); *B33Y 70/00* (2014.12); *B33Y 80/00* (2014.12)

(58) Field of Classification Search
CPC ..... C09D 11/30; C09D 11/101; B29C 64/112; B29K 2075/00; B29K 2995/007; B29K 2995/0081; B29K 2995/0082; B33Y 10/00; B33Y 70/00; B33Y 80/00
See application file for complete search history.

(56) References Cited

U.S. PATENT DOCUMENTS

| | | |
|---|---|---|
| 5,200,438 A | 4/1993 | Fuji et al. |
| 6,476,146 B2 | 11/2002 | Matzinger |
| 8,603,612 B2 | 12/2013 | Chopra et al. |
| 8,747,958 B2 | 6/2014 | Yokoi et al. |
| 9,012,527 B2 | 4/2015 | Chopra et al. |
| 2003/0092820 A1* | 5/2003 | Schmidt .............. C09D 11/101 524/487 |
| 2004/0145088 A1* | 7/2004 | Patel ................... B33Y 10/00 264/463 |
| 2005/0004288 A1 | 1/2005 | Koyanagi et al. |
| 2010/0247873 A1* | 9/2010 | Yokoi .................. C09D 11/101 428/195.1 |
| 2011/0236595 A1* | 9/2011 | Kodama ............... G03F 7/0002 427/553 |
| 2011/0262711 A1 | 10/2011 | Chopra et al. |
| 2014/0017460 A1 | 1/2014 | Xu et al. |

FOREIGN PATENT DOCUMENTS

| | | |
|---|---|---|
| CN | 1538978 | 10/2004 |
| CN | 102234460 | 11/2011 |
| CN | 102344715 | 2/2012 |
| CN | 103666081 | 3/2014 |
| EP | 0331841 | 4/1993 |
| EP | 1416003 | 5/2004 |
| JP | 07-005857 | 1/1995 |
| JP | 2731363 | 3/1998 |
| JP | 5534540 | 5/2014 |
| JP | 5623969 | 10/2014 |
| WO | 03/014177 | 2/2003 |
| WO | 2013/019821 | 2/2013 |

OTHER PUBLICATIONS

CVC Thermoset Specialties. Hypro Reactive Liquid Polymers 1300X13 CTBN and 1300 X13F CTBN. (Year: 2012).*
English Translation of India Office Action for Indian Patent Application No. 201717015945, dated Jun. 20, 2019 (6 pages).
English Translation of Japanese Office Action for Japanese Patent Application No. 2017-523868 dated May 31, 2018 (2 pages).
English Machine Translation of Japanese Application No. 2011-225878 filed on Apr. 20, 2011 (Apr. 20, 2011) (Japanese Publication No. JP20110094523); retrieved from the Internet: URL: https://register.epo.org/ipfwretrieve? apn=JP.2011094523.A&lng=en [retrieved on Jul. 10, 2018] (26 pages).
English Machine Translation of Japanese Application No. JP20130023574 filed on Feb. 8, 2013 (Feb. 8, 2013) (Japanese Publication No. JP201323574); retrieved from the Internet: URL:http://register.epo.org/ipfwretrieve? apn=JP.2013023574.A&lng=en [retrieved on Jul. 10, 2018] (59 pages).

(Continued)

*Primary Examiner* — Sathavaram I Reddy
(74) *Attorney, Agent, or Firm* — J. Clinton Wimbish; Nexsen Pruet, PLLC

(57) ABSTRACT

In one aspect, inks for use with a three-dimensional printing system are described herein. In some embodiments, an ink described herein comprises up to about 90 wt. % monofunctional curable material, up to about 10 wt. % difunctional curable material, and up to about 10 wt. % liquid rubber, based on the total weight of the ink, wherein the liquid rubber comprises one or more curable moieties. In some cases, the liquid rubber comprises one or more ethylenically unsaturated moieties. For example, in some instances, the liquid rubber comprises a butadiene acrylonitrile copolymer.

19 Claims, No Drawings

(56) References Cited

OTHER PUBLICATIONS

PCT International Search Report of the International Searching Authority for PCT/US2015/062163, dated Feb. 11, 2016 (6 pages).
PCT Written Opinion of the International Searching Authority for PCT/US2015/062163, dated Feb. 11, 2016 (5 pages).
PCT International Preliminary Report on Patentability of the International Search Authority for PCT/US2015/062163, dated Jun. 8, 2017 (7 pages).
English Translation of Chinese Office Action for China Patent Application No. 201580063819, dated Nov. 22, 2019 (11 pages).
English Translation of Korean Office Action for Korean Patent Application No. 10-2017-7016904, dated Nov. 26, 2018 (4 pages).

* cited by examiner

INKS COMPRISING LIQUID RUBBER FOR 3D PRINTING

CROSS REFERENCE TO RELATED APPLICATIONS

This application is a continuation of U.S. patent application Ser. No. 14/949,148, filed on Nov. 23, 2015, which claims priority pursuant to 35 U.S.C. § 119(e) to U.S. Provisional Patent Application Ser. No. 62/083,509, filed on Nov. 24, 2014, and to U.S. Provisional Patent Application Ser. No. 62/159,509, filed on May 11, 2015, each of which is hereby incorporated by reference in its entirety.

FIELD

The present invention relates to inks and, in particular, to inks comprising liquid rubber for use with three-dimensional (3D) printing systems.

BACKGROUND

Commercially available 3D printers, such as the ProJet™ 3D Printers manufactured by 3D Systems of Rock Hill, S.C., use inks, which are also known as build materials, that are jetted through a print head as a liquid to form various 3D objects, articles, or parts. Other 3D printing systems also use an ink that is jetted through a print head. In some instances, the ink is solid at ambient temperatures and converts to liquid at elevated jetting temperatures. In other instances, the ink is liquid at ambient temperatures.

Some inks can be formulated to provide flexible printed articles. However, some such articles do not exhibit other desired mechanical properties, such as one or more mechanical properties exhibited by traditional rubber or thermoplastic elastomer materials. For instance, some inks provide flexible articles that have a durometer value that is too high and/or an elongation at break value that is too low for certain applications. Additionally, some previous inks do not maintain their shape at high temperature, such that a loss of printing resolution can occur at elevated temperatures.

Therefore, there exists a need for improved inks for 3D printing, including for applications requiring a printed article exhibiting high flexibility, high elongation, high tearing strength, and/or reduced hardness.

SUMMARY

In one aspect, inks for use with a 3D printer are described herein which, in some embodiments, may offer one or more advantages over prior inks. In some embodiments, for example, an ink described herein can be used to provide printed articles having low modulus, high flexibility, high elongation, high tearing strength, and/or a Shore A hardness or durometer within a desired range. For instance, in some cases, an ink described herein, when cured, can exhibit a Shore A hardness of about 20-40 and/or an elongation at break of at least 300%. An ink described herein, in some instances, can also exhibit a high feature resolution, including at elevated temperatures.

In some embodiments, an ink for use in a 3D printing system described herein comprises one or more curable materials and one or more liquid rubber materials. In some cases, the curable materials of an ink described herein comprise one or more monofunctional curable materials and one or more difunctional curable materials. The liquid rubber material, in some embodiments, comprises one or more curable moieties. For example, in some instances, a liquid rubber comprises one or more ethyleneically unsaturated moieties. In some embodiments, a liquid rubber comprises a butadiene acrylonitrile copolymer. Moreover, such a butadiene acrylonitrile copolymer can be carboxyl terminated, amine terminated, vinyl terminated, or (meth)acrylate terminated. A butadiene acrylonitrile copolymer described herein can also have an acrylonitrile content of about 18-26%. Additionally, in some cases, the liquid rubber material can be present in an ink described herein in an amount up to about 10 weight percent (wt. %) or up to about 5 wt. %, based on the total weight of the ink.

Further, the monofunctional curable material can be present in an ink described herein in an amount up to about 90 wt. %, based on the total weight of the ink. Moreover, in some embodiments, a monofunctional curable material comprises one or more species of (meth)acrylates.

The difunctional curable material of an ink described herein may also comprise one or more species of (meth)acrylates. Additionally, a difunctional curable material can be present in the ink in an amount up to about 10 wt. %, based on the total weight of the ink.

Moreover, in some embodiments, an ink described herein further comprises a colorant, such as a molecular dye, a particulate inorganic pigment, or a particulate organic colorant. An ink described herein may also comprise one or more additives selected from the group consisting of photoinitiators, inhibitors, stabilizing agents, sensitizers, and combinations thereof. Non-curable viscosity modifying agents may also be included in an ink described herein.

In another aspect, methods of printing a 3D article are described herein. In some embodiments, a method of printing a 3D article comprises selectively depositing layers of an ink described herein in a fluid state onto a substrate. For example, in some cases, the ink comprises up to about 90 wt. % monofunctional curable material, up to about 10 wt. % difunctional curable material, and up to about 10 wt. % liquid rubber, based on the total weight of the ink, wherein the liquid rubber comprises one or more curable moieties. Further, the layers of the ink can be deposited according to an image of the 3D article in a computer readable format. Moreover, in some instances, a method described herein further comprises supporting at least one of the layers of the ink with a support material. A method described herein can also comprise curing the layers of the ink.

In another aspect, printed 3D articles are described herein. In some embodiments, a printed 3D article is formed from an ink described herein, such as an ink comprising up to about 90 wt. % monofunctional curable material, up to about 10 wt. % difunctional curable material, and up to about 10 wt. % liquid rubber, based on the total weight of the ink, wherein the liquid rubber comprises one or more curable moieties.

These and other embodiments are described in greater detail in the detailed description which follows.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 47 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other additive manufacturing techniques now known in the art or that may be known in the future that use a build material or ink to fabricate three-dimensional objects.

I. Inks for 3D Printing

In one aspect, inks for use with a 3D printer are described herein. In some embodiments, an ink described herein comprises one or more monofunctional curable materials, one or more difunctional curable materials, and one or more liquid rubber materials. Additionally, an ink described herein, in some cases, further comprises a colorant, such as a molecular dye, a particulate inorganic pigment, or a particulate organic colorant. An ink described herein may also comprise one or more additives selected from the group consisting of photoinitiators, inhibitors, stabilizing agents, sensitizers, and combinations thereof. Moreover, in some instances, an ink described herein further comprises a non-curable viscosity modifying agent.

Turning now to specific components of inks, inks described herein comprise monofunctional and difunctional curable materials. A "monofunctional" curable material, for reference purposes herein, comprises a chemical species that includes one curable or polymerizable moiety. Similarly, a "difunctional" curable material comprises a chemical species that includes two curable or polymerizable moieties. A "polymerizable moiety," for reference purposes herein, comprises a moiety that can be polymerized or cured to provide a printed 3D article or object. Such polymerizing or curing can be carried out in any manner not inconsistent with the objectives of the present disclosure. In some embodiments, for example, polymerizing or curing comprises irradiating a polymerizable or curable material with electromagnetic radiation having sufficient energy to initiate a polymerization or cross-linking reaction. For instance, in some cases, ultraviolet (UV) radiation can be used. Thus, in some instances, a polymerizable moiety comprises a photo-polymerizable or photo-curable moiety, such as a UV-polymerizable moiety. In some embodiments, a curable material described herein is photo-polymerizable or photo-curable at wavelengths ranging from about 300 nm to about 400 nm. Alternatively, in other instances, a curable material is photo-polymerizable at visible wavelengths of the electromagnetic spectrum.

Moreover, a polymerization reaction, in some cases, comprises a free radical polymerization, such as that between points of unsaturation, including points of ethyleneic unsaturation. Other polymerization reactions may also be used. As understood by one of ordinary skill in the art, a polymerization reaction used to polymerize or cure a curable material described herein can comprise a reaction of a plurality of "monomers" or chemical species having one or more functional groups or moieties that can react with one another to form one or more covalent bonds.

One non-limiting example of a polymerizable moiety of a curable material described herein is an ethyleneically unsaturated moiety, such as a vinyl moiety, allyl moiety, or (meth)acrylate moiety, where the term "(meth)acrylate" includes acrylate or methacrylate or a mixture or combination thereof. Thus, in some embodiments, a monofunctional curable material of an ink described herein comprises a mono(meth)acrylate, and a difunctional curable material of an ink described herein comprises a di(meth)acrylate. Other monofunctional and difunctional curable materials may also be used.

Moreover, a monofunctional or difunctional curable material, in some cases, can comprise a relatively low molecular weight species or a relatively high molecular weight species. For example, a monofunctional or difunctional curable material can comprise either a "monomeric" or molecular species (a species that is itself not a polymer or oligomer), or an oligomeric species that is capable of undergoing additional polymerization, such as through one or more points of unsaturation described herein. Additionally, in some embodiments, a monofunctional or difunctional curable material of an ink described herein comprises a combination of one or more monomeric chemical species and one or more oligomeric chemical species described herein.

In general, any monofunctional and difunctional curable materials not inconsistent with the objectives of the present disclosure may be used. In some cases, the monofunctional and/or difunctional curable material of an ink described herein comprises one or more species of (meth)acrylates. In some embodiments, for instance, a curable material comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl (meth)acrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or a combination thereof. In some embodiments, a curable material comprises a monofunctional aliphatic urethane (meth)acrylate.

In some embodiments, a curable material comprises one or more of allyl acrylate, allyl methacrylate, triethylene glycol di(meth)acrylate, tricyclodecane dimethanol diacrylate, and cyclohexane dimethanol diacrylate. Additionally, in some embodiments, a polymerizable component comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl) methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

Additional non-limiting examples of commercially available curable materials useful in some embodiments described herein include the following: isobornyl acrylate (IBOA), commercially available from SARTOMER under the trade name SR 506A; isobornyl methacrylate, commercially available from SARTOMER under the trade name SR 423A; alkoxylated tetrahydrofurfuryl acrylate, commercially available from SARTOMER under the trade name SR 611; monofunctional urethane acrylate, commercially available from RAHN USA under the trade name GENOMER 1122; aliphatic urethane diacrylate, commercially available from ALLNEX under the trade name EBECRYL 8402; triethylene glycol diacrylate, commercially available from SARTOMER under the trade name SR 272; and triethylene glycol dimethacrylate, commercially available from SARTOMER under the trade name SR 205. Other commercially available curable materials may also be used.

In addition, in some cases, a monofunctional or difunctional curable material comprises an aliphatic polyester urethane acrylate oligomer, a urethane (meth)acrylate resin, and/or an acrylate amine oligomeric resin, such as EBECRYL 7100. Generally, a UV polymerizable or curable resin or oligomer can comprise any methacrylate or acrylate resin which polymerizes in the presence of a free radical photoinitiator, is thermally stable in an exposed state for at least one week at the jetting temperature of the ink and for at least 4 weeks in an enclosed state, and/or has a boiling point greater than the jetting temperature. Further, in some embodiments, a polymerizable component has a flash point above the jetting temperature.

Urethane (meth)acrylates suitable for use in inks described herein, in some cases, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers, in some cases, can be from about 400 to 10,000 or from about 500 to 7,000. Urethane (meth)acrylates are also commercially available from SARTOMER under the product names CN980, CN981, CN975 and CN2901, or from BOMAR Specialties Co. under the product name BR-741. In some embodiments described herein, a urethane (meth)acrylate oligomer has a viscosity ranging from about 140,000 centipoise (cP) to about 160,000 cP at about 50° C. or from about 125,000 cP to about 175,000 cP at about 50° C. when measured in a manner consistent with ASTM D2983. In some cases, a urethane (meth)acrylate oligomer has a viscosity ranging from about 100,000 cP to about 200,000 cP at about 50° C. or from about 10,000 cP to about 300,000 cP at about 50° C. when measured in a manner consistent with ASTM D2983.

A curable material described herein, in some instances, may also comprise a polypropylene glycol monomethacrylate or polyethylene glycol monomethacrylate.

A monofunctional curable material can be present in an ink described herein in any amount not inconsistent with the objectives of the present disclosure. In some cases, monofunctional curable material is present in an amount up to about 90 wt. %, up to about 85 wt. %, up to about 80 wt. %, or up to about 75 wt. %, based on the total weight of the ink. In some cases, an ink described herein comprises about 50-90 wt. % monofunctional curable material, based on the total weight of the ink. In some embodiments, an ink comprises about 65-90 wt. %, 65-85 wt. %, 70-90 wt. %, 75-90 wt. %, or 80-90 wt. % monofunctional curable material, based on the total weight of the ink.

Similarly, a difunctional curable material can be present in an ink described herein in any amount not inconsistent with the objectives of the present disclosure. In some cases, difunctional curable material is present in an amount up to about 12 wt. %, up to about 10 wt. %, up to about 7 wt. %, or up to about 5 wt. %, based on the total weight of the ink. In some cases, an ink described herein comprises about 1-12 wt. % difunctional curable material, based on the total weight of the ink. In some embodiments, an ink comprises about 1-10 wt. %, 3-10 wt. %, 3-7 wt. %, 4-12 wt. %, or 4-10 wt. % difunctional curable material, based on the total weight of the ink.

In addition to the monofunctional and difunctional curable materials described above, it is also possible, in some cases, to include a trifunctional or higher functional curable material in an ink described herein. For example, in some instances, one or more tri(meth)acrylates may be used. However, it is to be understood that the functionality (i.e., mono-, di-, tri-, or higher functionality) and the molecular weight of the curable materials of an ink described herein can be selected to provide an ink having a viscosity suitable for use in a desired 3D printing system, such a 3D printing system using a piezoelectric print head to dispense inks, as described further herein. Further, the curable components of an ink described herein can be selected to provide an ink having such a viscosity even after the addition of a liquid rubber material described herein. Non-limiting examples of trifunctional or higher (meth)acrylates that may be suitable for use in some embodiments described herein include 1,1-trimethylolpropane tri(meth)acrylate, ethoxylated or propoxylated 1,1,1-trimethylolpropanetri(meth)acrylate, ethoxylated or propoxylated glycerol tri(meth)acrylate, pentaerythritol monohydroxy tri(meth)acrylate, di pentaerythritol monohydroxy penta(meth)acrylate, and bis(trimethylolpropane) tetra(meth)acrylate.

Inks described herein also comprise liquid rubber. Moreover, a liquid rubber of an ink described herein can comprise one or more curable moieties. A "curable moiety" of a liquid rubber material, for reference purposes herein, comprises a moiety that can be polymerized, cured, or reacted with a polymerizable moiety of a monofunctional or difunctional curable material of the ink, including in a manner described hereinabove for monofunctional and difunctional curable materials. For example, in some embodiments, the liquid rubber material comprises one or more ethyleneically unsaturated moieties, such as one or more (meth)acrylate moieties.

Any liquid rubber not inconsistent with the objectives of the present disclosure may be used. In some cases, the liquid rubber comprises a liquid isoprene rubber or synthetic polyisoprene, such as cis-polyisoprene. In other instances, liquid rubber comprises a styrene butadiene rubber (SBR). In addition, in some embodiments, the liquid rubber of an ink described herein comprises a liquid butadiene rubber or nitrile rubber such as a butadiene acrylonitrile copolymer. For example, in some instances, the liquid rubber is formed from the reaction of acrylonitrile or 2-propenenitrile with 1,3-butadiene or 1,4-butadiene. Such a liquid rubber can be a copolymer of acrylonitrile and butadiene having any ratio of acrylonitrile units to butadiene units not inconsistent with the objectives of the present disclosure. In some cases, for example, a butadiene acrylonitrile copolymer has an acrylonitrile content or "ACN content" of about 10-40%, 15-35%, 18-30%, or 18-26%. Moreover, in some embodiments, the acrylonitrile content of a copolymer described herein is selected to provide a copolymer having a desired glass transition temperature. Further, in some cases, a butadiene acrylonitrile copolymer described herein comprises a mixture of products formed from the reaction of desired amounts of acrylonitrile and butadiene. In some such instances, the mixture of products is a statistical mixture of products.

In addition, a butadiene acrylonitrile copolymer described herein can comprise various terminating or end groups. For instance, in some embodiments, a butadiene acrylonitrile copolymer described herein is carboxyl or carboxylic acid terminated, amine (primary or secondary) terminated, vinyl terminated, or (meth)acrylate terminated.

A butadiene acrylonitrile copolymer described herein, in some cases, has the structure of Formula (I):

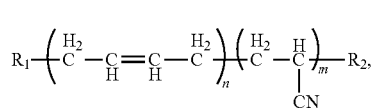

wherein $R_1$ and $R_2$ are each a terminal group, and n and m are each independently 10-1000, 10-100, 10-50, or 100-1000. In some embodiments, $R_1$ and/or $R_2$ comprises a carboxyl or carboxylic acid group, amine group, vinyl group, or (meth)acrylate group. Further, it is to be understood that the terminal groups $R_1$ and $R_2$ in Formula (I) can comprise moieties corresponding to the reaction product of the butadiene acrylonitrile copolymer backbone with a species used to terminate the copolymer. For example, in some instances, a terminal group $R_1$ or $R_2$ can represent not only the terminal group itself (e.g., the carboxyl, amine, vinyl, or (meth)acrylate group), but also an additional portion of the reaction product of the butadiene acrylonitrile copolymer backbone with a species used to terminate the copolymer, such as a glycidyl (meth)acrylate species used to form a (meth)acrylate terminated copolymer.

Moreover, in some cases, the terminal groups of a butadiene acrylonitrile copolymer described herein can be selected to provide one or more additional properties to the copolymer. For instance, in some embodiments, a carboxylic acid terminated butadiene acrylonitrile copolymer described herein can have an acid number of about 20-45 (mg KOH/g copolymer) or about 25-35 (mg KOH/g copolymer). Similarly, in some instances, an amine terminated copolymer can have an amine value of about 25-150 (mg KOH/g copolymer).

Further, a butadiene acrylonitrile copolymer described herein can have any molecular weight not inconsistent with the objectives of the present disclosure. In some embodiments, for instance, a butadiene acrylonitrile copolymer has a number average molecular weight (Mn) of about 3000-10,000 or about 3000-5000. Additionally, in some cases, a butadiene acrylonitrile copolymer described herein has a Brookfield viscosity at 27° C. of about 50,000-700,000 cP or about 130,000-500,000 cP.

Non-limiting examples of commercially available liquid rubber materials suitable for use in some embodiments described herein include carboxyl terminated butadiene acrylonitrile copolymers, commercially available from EMERALD PERFORMANCE MATERIALS under the trade name HYPRO CTBN POLYMERS; amine terminated butadiene acrylonitrile copolymers, commercially available from EMERALD PERFORMANCE MATERIALS under the trade name HYPRO ATBN POLYMERS; vinyl terminated butadiene acrylonitrile copolymers, commercially available from EMERALD PERFORMANCE MATERIALS under the trade name HYPRO VTBN POLYMERS; and methacrylate terminated butadiene acrylonitrile copolymers, commercially available from EMERALD PERFORMANCE MATERIALS under the trade name HYPRO VTBNX POLYMERS.

A liquid rubber material described herein can be present in an ink in any amount not inconsistent with the objectives of the present disclosure. In some cases, for example, liquid rubber is present in the ink in an amount of up to about 20 wt. %, up to about 15 wt. %, up to about 10 wt. %, or up to about 5 wt. %, based on the total weight of the ink. In some embodiments, the liquid rubber is present in the ink in an amount of about 1-20 wt. %, 1-15 wt. %, 1-12 wt. %, 1-10 wt. %, 1-5 M. %, 3-12 wt. %, 3-10 wt. %, 5-15 wt. %, or 5-10 wt. %, based on the total weight of the ink.

An ink described herein can also comprise a colorant. The colorant of an ink described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of an ink comprises an inorganic pigment, such as $TiO_2$ and/or ZnO. In some embodiments, the colorant of an ink comprises a colorant for use in a RGB, sRGB, CMY, CMYK, L*a*b*, or Pantone® colorization scheme. In some instances, one or more colorants of an ink described herein exhibits a white color. In other cases, a colorant exhibits a black color. Some non-limiting examples of colorants suitable for use in some embodiments described herein include SUN UVDJ107, SUN UVDJ354, SUN UVDJ322, SUN UVDJ150, SUN UVDJ350, RJA D3010-FX-Y150, RJA D3410-FX-Y150, and PENN COLOR 96898. Moreover, in some cases, a particulate colorant described herein has an average particle size of less than about 5 µm, or less than about 1 µm. In some instances, a particulate colorant described herein has an average particle size of less than about 500 nm, such as an average particle size of less than about 400 nm, less than about 300 nm, less than about 250 nm, less than about 200 nm, or less than about 150 nm. In some instances, a particulate colorant has an average particle size of about 50-5000 nm, about 50-1000 nm, or about 50-500 nm.

A colorant can be present in an ink described herein in any amount not inconsistent with the objectives of the present disclosure. In some cases, colorant is present in the ink in an amount up to about 2 wt. %, or an amount of about 0.005-2 wt. %, 0.01-2 wt. %, 0.01-1.5 wt. %, 0.01-1 wt. %, 0.01-0.5 wt. %, 0.1-2 wt. %, 0.1-1 wt. %, 0.1-0.5 wt. %, or 0.5-1.5 wt. %, based on the total weight of the ink.

In some embodiments, an ink described herein can also include one or more non-curable viscosity modifying agents, where a "non-curable" viscosity modifying agent is free or substantially free of a moiety that can be polymerized or cured with the curable materials of the ink. In some cases, for instance, a non-curable viscosity modifying agent is free or substantially free of an ethyleneically unsaturated moiety such as a (meth)acrylate moiety. A viscosity modifying agent that is "substantially" free of a moiety, as used herein, can comprise less than about 10 mol. % or less than about 5 mol. % of the moiety, based on the total amount of the viscosity modifying agent. Any viscosity modifying agent not inconsistent with the objectives of the present disclosure may be used in an ink described herein. For example, in some embodiments, a non-curable viscosity modifying agent comprises a saturated fatty acid or a combination of saturated fatty acids. In some instances, a non-curable viscosity modifying agent comprises an oil, such as a plant oil.

A viscosity modifying agent can be present in an ink described herein in any amount not inconsistent with the objectives of the present disclosure. In some cases, a non-curable viscosity modifying agent is present in the ink in an amount of about 1-10 wt. %, 1-7 wt. %, or 1-5 wt. %, based on the total weight of the ink.

In addition, inks described herein, in some embodiments, further comprise one or more other additives. In some cases, an ink described herein further comprises one or more additives selected from the group consisting of photoinitiators, inhibitors, stabilizing agents, sensitizers, and combinations thereof. For example, in some instances, an ink further comprises one or more photoinitiators. Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 400 nm or between about 300 nm and about 385 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Suitable photoinitiators can also comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, inks containing ionic dye-counter ion compounds can be cured more variably with visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in an ink described herein in any amount not inconsistent with the objectives of the present disclosure. In some embodiments, a photoinitiator is present in an ink in an amount of up to about 5 wt. %, based on the total weight of the ink. In some cases, a photoinitiator is present in an amount ranging from about 0.1 wt. % to about 5 wt. %.

Moreover, in some embodiments, an ink described herein further comprises one or more sensitizers. A sensitizer can be added to an ink to increase the effectiveness of one or more photoinitiators that may also be present. Any sensitizer not inconsistent with the objectives of the present disclosure may be used. In some cases, a sensitizer comprises isopropylthioxanthone (ITX) or 2-chlorothioxanthone (CTX).

A sensitizer can be present in an ink in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the ink.

In addition, an ink described herein, in some embodiments, further comprises one or more polymerization inhibitors or stabilizing agents. A polymerization inhibitor can be added to an ink to provide additional thermal stability to the composition. Any polymerization inhibitor not inconsistent with the objectives of the present disclosure may be used. Moreover, a polymerization inhibitor can retard or decrease the rate of polymerization, and/or prevent polymerization from occurring for some period of time or "induction time" until the polymerization inhibitor is consumed. Further, in some cases, a polymerization inhibitor described herein is an "addition type" inhibitor. An inhibitor described herein can also be a "chain transfer type" inhibitor. Additionally, in some instances, a polymerization inhibitor described herein is a carbon-centered radical scavenger that reacts with carbon-centered free radicals. For example, in some cases, a suitable polymerization inhibitor comprises methoxyhydroquinone (MEHQ). A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT), which can also be used as a polymerization inhibitor in some embodiments described herein. More generally, a single species may serve as both a stabilizing agent and a polymerization inhibitor. It is also possible, in some cases, to use a plurality of inhibitors and/or stabilizing agents, wherein differing inhibitors and/or stabilizers provide differing effects and/or work synergistically.

A polymerization inhibitor and/or a stabilizing agent can be present in an ink in any amount not inconsistent with the objectives of the present disclosure. In some embodiments, a polymerization inhibitor is present in an amount ranging from about 0.1 wt. % to about 2 wt. % or from about 0.5 wt. % to about 1 wt. %. Similarly, in some cases, a stabilizing agent is present in an ink in an amount ranging from about 0.1 wt. % to about 5 wt. %, from about 0.5 wt. % to about 4 wt. %, or from about 1 wt. % to about 3 wt. %, based on the total weight of the ink.

Various components of inks have been described herein. It is to be understood that an ink described herein can include any combination of specific components not inconsistent with the objectives of the present disclosure.

Inks described herein can also exhibit a variety of desirable properties. For example, an ink described herein can have any freezing point, melting point, and/or other phase transition temperature not inconsistent with the objectives of the present disclosure. In some cases, an ink has freezing and melting points consistent with temperatures used in some 3D printing systems, including 3D printing systems designed for use with phase changing inks. In some embodiments, the freezing point of an ink is greater than about 40° C. In some instances, for example, an ink has a freezing point centered at a temperature ranging from about 45° C. to about 55° C. or from about 50° C. to about 80° C. In some cases, an ink has a freezing point below about 40° C. or below about 30° C.

Further, in some embodiments described herein, an ink exhibits a sharp freezing point or other phase transition. In some cases, for instance, an ink freezes over a narrow range of temperatures, such as a range of about 1-10° C., about 1-8° C., or about 1-5° C. In some embodiments, an ink having a sharp freezing point freezes over a temperature range of X±2.5° C., where X is the temperature at which the freezing point is centered (e.g., X=65° C.).

In addition, an ink described herein, in some cases, is fluid at jetting temperatures encountered in 3D printing systems. Moreover, in some embodiments, an ink solidifies once deposited on a surface during the fabrication of a three-dimensionally printed article or object. Alternatively, in other instances, an ink remains substantially fluid upon deposition on a surface. Solidification of an ink, in some embodiments, occurs through a phase change of the ink or a component of the ink. The phase change can comprise a liquid to solid phase change or a liquid to semi-solid phase change. Further, in some instances, solidification of an ink comprises an increase in viscosity of the ink, such as an increase in viscosity from a low viscosity state to a high viscosity state.

Additionally, in some embodiments, an ink described herein, when non-cured, has a viscosity profile consistent with the requirements and parameters of one or more 3D printing systems. In some cases, for example, an ink described herein has a dynamic viscosity ranging from about 8.0 cP to about 14.0 cP at a temperature of about 80° C. when measured according to ASTM standard D2983 (e.g., using a Brookfield Model DV-II+ Viscometer). In some embodiments, an ink has a dynamic viscosity of about 9.5-12.5 cP or about 10.5-12.5 cP at a temperature of about 80° C. In some cases, an ink has a viscosity of about 8.0-10.0 cP at a temperature of about 85-87° C. In some embodiments, an ink described herein has a dynamic viscosity of about 8.0-19.0 cP, about 8.0-13.5 cP, about 11.0-14.0 cP, about 11.5-13.5 cP, or about 12.0-13.0 cP at a temperature of about 65° C., when measured according to ASTM standard D2983. In some instances, an ink described herein when non-cured exhibits a dynamic viscosity of about 100-1000 cP, about 200-900 cP, about 300-900 cP, about 300-800 cP, about 400-1000 cP, about 400-900 cP, about 400-800 cP, about 400-600 cP, about 450-550 cP, about 500-700 cP, about 500-600 cP, or about 500-550 cP at 30° C., when measured according to ASTM D2983. In some cases, an ink described herein when non-cured exhibits a dynamic viscosity of less than about 100 cP or more than about 1000 cP, when measured according to ASTM D2983.

Further, inks described herein, in some embodiments, can exhibit a combination of one or more desirable features. In some cases, for instance, an ink in the non-cured state has one or more of the following properties:
1. Freezing point below about 30° C., below about 25° C., or below about 15° C.;
2. Viscosity of about 8-16 cP at 70-95° C. or about 500-700 cP at 25-35° C.; and
3. Thermal stability for at least 6 months at room temperature (25° C.).

As described above, viscosity can be measured according to ASTM D2983 (e.g., using a Brookfield Model DV-II+ Viscometer). In addition, for reference purposes herein, a "thermally stable" material exhibits no greater than about a 35 percent change in viscosity over a specified time period (e.g., 3 days) when measured at the specified temperature (e.g., room temperature) at the beginning and at the end of the time period. In some embodiments, the viscosity change is no greater than about 30 percent or no greater than about 20 percent, based on the larger viscosity value. In some cases, the viscosity change is between about 10 percent and about 20 percent or between about 25 percent and about 30 percent. Moreover, in some embodiments, the change in viscosity is an increase in viscosity.

Inks described herein can also exhibit a variety of desirable properties, in addition to those described hereinabove, in a cured state. An ink in a "cured" state, as used herein, comprises an ink that includes a curable material or polymerizable component that has been at least partially polymerized and/or cross-linked. For instance, in some cases, a cured ink is at least about 10% polymerized or cross-linked or at least about 30% polymerized or cross-linked. In some embodiments, a cured ink is at least about 50%, at least about 70%, at least about 80%, or at least about 90% polymerized or cross-linked. In some instances, a cured ink is between about 10% and about 99% polymerized or cross-linked.

In some cases, an ink described herein, when cured, has a Shore A hardness of about 15-45, 20-40, or 25-35, when measured according to ASTM D2240. Additionally, a cured ink described herein, in some cases, has an elongation at break of at least about 300%, at least about 500%, or at least about 700%, when measured according to ASTM D638. In some instances, a cured ink described herein has an elongation at break of about 300-900%, 300-800%, 300-600%, 500-900%, 500-800%, or 500-750%, when measured according to ASTM D638. Further, a cured ink described herein, in some cases, can have a tensile strength of about 30-150 psi or about 80-130 psi, when measured according to ASTM D638. In some embodiments, a cured ink has a tear strength of about 10-20 kg/cm, when measured according to ASTM D624. Moreover, in some cases, an ink described herein, when cured, can exhibit a plurality of the foregoing properties. For example, in some embodiments, an ink when cured has a Shore A hardness of about 20-40 and an elongation at break of about 300-800%.

Inks described herein can be produced in any manner not inconsistent with the objectives of the present disclosure. In some embodiments, for instance, a method for the preparation of an ink described herein comprises the steps of mixing the components of the ink, melting the mixture, and filtering the molten mixture. Melting the mixture, in some cases, is carried out at a temperature of about 75° C. or in a range from about 75° C. to about 85° C. In some embodiments, an ink described herein is produced by placing all components of the ink in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting or extrusion. The filtered mixture can then be cooled to ambient temperatures and stored until ready for use in a 3D printing system.

II. Methods of Printing a 3D Article

In another aspect, methods of printing a 3D article or object are described herein. Methods of printing a 3D article or object described herein can include forming the 3D article from a plurality of layers of an ink described herein in a layer-by-layer manner. Any ink described hereinabove in Section I may be used. For example, in some cases, the ink comprises up to about 90 wt. % monofunctional curable material, up to about 10 wt. % difunctional curable material, and up to about 10 wt. % liquid rubber, based on the total weight of the ink, wherein the liquid rubber comprises one or more curable moieties. Further, the layers of an ink can be deposited according to an image of the 3D article in a computer readable format. In some embodiments, the ink is deposited according to preselected computer aided design (CAD) parameters. Moreover, in some cases, one or more layers of an ink described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include so-called "multi-jet" or "stereolithography" 3D printing methods. For example, in some instances, a multi-jet method of printing a 3D article comprises selectively depositing layers of an ink described herein in a fluid state onto a substrate, such as a build pad of a 3D printing system. In addition, in some embodiments, a method described herein further comprises supporting at least one of the layers of the ink with a support material. Any support material not inconsistent with the objectives of the present disclosure may be used.

A method described herein can also comprise curing the layers of the ink. For example, in some instances, a method of printing a 3D article described herein further comprises subjecting the ink to electromagnetic radiation of sufficient wavelength and intensity to cure the ink, where curing can comprise polymerizing one or more polymerizable moieties or functional groups of one or more components of the ink. In some cases, a layer of deposited ink is cured prior to the deposition of another or adjacent layer of ink.

Further, in some embodiments, a preselected amount of ink described herein is heated to the appropriate temperature and jetted through the print head or a plurality of print heads of a suitable inkjet printer to form a layer on a print pad in a print chamber. In some cases, each layer of ink is deposited according to the preselected CAD parameters. A suitable print head to deposit the ink, in some embodiments, is a piezoelectric print head. Additional suitable print heads for the deposition of ink and support material described herein are commercially available from a variety of ink jet printing apparatus manufacturers. For example, Xerox, Hewlett Packard, or Ricoh print heads may also be used in some instances.

Additionally, in some embodiments, an ink described herein remains substantially fluid upon deposition. Alternatively, in other instances, the ink exhibits a phase change upon deposition and/or solidifies upon deposition. Moreover, in some cases, the temperature of the printing environment can be controlled so that the jetted droplets of ink solidify on contact with the receiving surface. In other embodiments, the jetted droplets of ink do not solidify on contact with the receiving surface, remaining in a substantially fluid state. Additionally, in some instances, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some cases, the wiper device comprises a roller and a wiper that removes excess material from the roller. Further, in some instances, the wiper device is heated. It should be noted that the consistency of the jetted ink described herein prior to curing, in some embodiments, should desirably be sufficient to retain its shape and not be subject to excessive viscous drag from the planarizer.

Moreover, a support material, when used, can be deposited in a manner consistent with that described hereinabove for the ink. The support material, for example, can be deposited according to the preselected CAD parameters such that the support material is adjacent or continuous with one or more layers of the ink. Jetted droplets of the support material, in some embodiments, solidify or freeze on contact with the receiving surface. In some cases, the deposited support material is also subjected to planarization.

Layered deposition of the ink and support material can be repeated until the 3D article has been formed. In some embodiments, a method of printing a 3D article further comprises removing the support material from the ink.

It is also possible to form a 3D article from an ink described herein using stereolithography. For example, in some cases, a method of printing a 3D article comprises retaining an ink described herein in a fluid state in a container and selectively applying energy to the ink in the container to solidify at least a portion of a fluid layer of the ink, thereby forming a solidified layer that defines a cross-section of the 3D article. Additionally, a method described herein can further comprise raising or lowering the solidified layer of ink to provide a new or second fluid layer of unsolidified ink at the surface of the fluid ink in the container, followed by again selectively applying energy to the ink in the container to solidify at least a portion of the new or second fluid layer of the ink to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the ink. Moreover, selectively applying energy to the ink in the container can comprise applying electromagnetic radiation, such as UV radiation, having a sufficient energy to cure the ink. In some cases, the curing radiation is provided by a computer controlled laser beam. In addition, in some cases, raising or lowering a solidified layer of ink is carried out using an elevator platform disposed in the container of fluid ink. A method described herein can also comprise planarizing a new layer of fluid ink provided by raising or lowering an elevator platform. Such planarization can be carried out, in some cases, by a wiper or roller.

It is further to be understood that the foregoing process can be repeated a desired number of times to provide the 3D article. For example, in some cases, this process can be repeated "n" number of times, wherein n can be up to about 100,000, up to about 50,000, up to about 10,000, up to about 5000, up to about 1000, or up to about 500. Thus, in some embodiments, a method of printing a 3D article described herein can comprise selectively applying energy to an ink in a container to solidify at least a portion of an nth fluid layer of the ink, thereby forming an nth solidified layer that defines an nth cross-section of the 3D article, raising or lowering the nth solidified layer of ink to provide an (n+1)th layer of unsolidified ink at the surface of the fluid ink in the container, selectively applying energy to the (n+1)th layer of ink in the container to solidify at least a portion of the (n+1)th layer of the ink to form an (n+1)th solidified layer that defines an (n+1)th cross-section of the 3D article, raising or lowering the (n+1)th solidified layer of ink to provide an (n+2)th layer of unsolidified ink at the surface of the fluid ink in the container, and continuing to repeat the foregoing steps to form the 3D article. Further, it is to be understood that one or more steps of a method described herein, such as a step of selectively applying energy to a layer of ink, can be carried out according to an image of the 3D article in a computer-readable format. General methods of 3D printing using stereolithography are further described, inter alia, in U.S. Pat. Nos. 5,904,889 and 6,558,606.

Performing a printing process described above can provide a printed 3D article from an ink described herein that has a high feature resolution, including at elevated temperatures, such as temperatures above 50° C., above 80° C., or between about 50° C. and 100° C. The "feature resolution" of an article, for reference purposes herein, can be the smallest controllable physical feature size of the article. The feature resolution of an article can be described in terms of a unit of distance such as microns (μm), or in terms of dots per inch (dpi). As understood by one of ordinary skill in the art, a higher feature resolution corresponds to a higher dpi value but a lower distance value in μm. In some cases, an article formed by depositing or solidifying an ink described herein can have a feature resolution of about 500 μm or less, about 200 μm or less, about 100 μm or less, or about 50 μm or less, including at elevated temperatures. In some embodiments, an article has a feature resolution between about 50 μm and about 500 μm, between about 50 μm and about 200 μm, between about 50 μm and about 100 μm, or between about 100 μm and about 200 μm. Correspondingly, in some instances, an article described herein has a feature resolution of at least about 100 dpi, at least about 200 dpi, at least about 250 dpi, at least about 400 dpi, or at least about 500 dpi. In some cases, the feature resolution of an article is between about 100 dpi and about 600 dpi, between about 100 dpi and about 250 dpi, or between about 200 dpi and about 600 dpi, including at elevated temperatures.

III. Printed 3D Articles

In another aspect, printed 3D articles are described herein. In some embodiments, a printed 3D article is formed from an ink described herein. Any ink described hereinabove in Section I may be used. For example, in some cases, the ink comprises up to about 90 wt. % monofunctional curable material, up to about 10 wt. % difunctional curable material, and up to about 10 wt. % liquid rubber, based on the total weight of the ink, wherein the liquid rubber comprises one or more curable moieties.

Some embodiments described herein are further illustrated in the following non-limiting examples.

Examples

Inks according to some embodiments described herein were prepared as follows. Specifically, to prepare various inks, the components of Table I were mixed in a reaction vessel. The amounts in Table I refer to the wt. % of each component of the identified ink, based on the total weight of the ink. For each ink, the appropriate mixture was heated to a temperature of about 75-85° C. with stirring. The heating and stirring were continued until the mixture attained a substantially homogenized molten state. The molten mixture was then filtered. Next, the filtered mixture was allowed to cool to ambient temperature.

For Inks 1, 2, 9, and 14, the monofunctional curable material ("Monofunctional" in Table I) was a mixture of GENOMER 1122 and SR 506. For Ink 3, the monofunctional curable material was a mixture of GENOMER 1122, SR 506, and SR 611. For Inks 4-8, 10-13, and 15-18, the monofunctional curable material was a mixture of GENOMER 1122 and SR 423A. The difunctional curable material ("Difunctional" in Table I) for all inks was EBECRYL 8402. The liquid rubber material ("Rubber" in Table I) for all inks was a butadiene acrylonitrile copolymer, either HYPRO CTBN or HYPRO VTBNX. For Inks 1-9 and 14-18, the photoinitiator ("PI" in Table I) was Irgacure 819. For Inks 10-13, the photoinitiator material was TPO. The stabilizer ("Stab." In Table I) was BHT (for Inks 1-16) or a mixture of BHT and MAYZO BNX3052 (for Inks 17 and 18). The non-curable viscosity modifying agent ("VMA" in Table I) was coconut oil. The colorant ("Colorant" in Table I) was PENN COLOR 96898 (for Ink 1) or SUN UVDJ107 (for Inks 16 and 18).

Various properties of the inks are provided in Table II. The viscosities in Table II are dynamic viscosities measured at 80° C. in the manner described hereinabove.

TABLE I

Ink Components.

| Inks | Monofunctional | Difunctional | Rubber | PI | Stab. | VMA | Colorant |
|---|---|---|---|---|---|---|---|
| 1 | 84.7 | 5 | 8 | 2 | 0.2 | — | 0.1 |
| 2 | 84.7 | 5 | 8 | 2 | 0.2 | — | — |
| 3 | 82.7 | 7 | 8 | 2 | 0.2 | — | — |
| 4 | 84.7 | 5 | 8 | 2 | 0.2 | — | — |
| 5 | 85.7 | 4 | 8 | 2 | 0.2 | — | — |
| 6 | 88.2 | — | 9.5 | 2 | 0.2 | — | — |
| 7 | 85.7 | 3 | 9 | 2 | 0.2 | — | — |
| 8 | 86.7 | 3 | 9 | 1 | 0.2 | — | — |
| 9 | 84 | 8.3 | 6.5 | 1 | 0.2 | — | — |
| 10 | 80.7 | 3 | 9 | 1 | 0.2 | 6 | — |
| 11 | 80.7 | 3 | 9 | 1 | 0.2 | 6 | — |
| 12 | 79.7 | 3 | 9 | 2 | 0.2 | 6 | — |
| 13 | 82.9 | 3 | 9 | 1.5 | 0.5 | 3 | — |
| 14 | 72.3 | 5 | 8 | 2 | 0.2 | 12.5 | — |
| 15 | 77.5 | 3 | 9 | 2 | 0.5 | 8 | — |
| 16 | 77.4 | 3 | 9 | 2 | 0.5 | 8 | 0.1 |
| 17 | 77 | 3 | 9 | 2 | 1 | 8 | — |
| 18 | 76.9 | 3 | 9 | 2 | 1 | 8 | 0.1 |

TABLE II

Ink Properties.

| | Viscosity (cP) | Elongation (%) | Tensile Strength (psi) | Shore A |
|---|---|---|---|---|
| Ink 1 | 10.5 | 600 | 120 | 40 |
| Ink 2 | 10.5 | — | — | — |
| Ink 3 | 10.2 | — | — | — |
| Ink 4 | 10.3 | 640 | 79 | — |
| Ink 5 | 10.5 | 654 | 57 | — |
| Ink 6 | 10.3 | — | — | — |
| Ink 7 | 11 | 876 | 56 | 37 |
| Ink 8 | — | — | — | — |
| Ink 9 | 10.4 | — | — | — |
| Ink 10 | 11.2 | 562 | 30 | 25 |
| Ink 11 | 10.9 | 651 | 35 | 30 |
| Ink 12 | 10.9 | 850 | 40 | 35 |
| Ink 13 | — | — | — | 35 |
| Ink 14 | 10.5 | 580 | 120 | 39 |
| Ink 15 | 11.8 | 967 | 71 | 25 |
| Ink 16 | 11.8 | — | 59 | 24 |
| Ink 17 | 11.7 | — | — | — |
| Ink 18 | 11.6 | — | — | — |

In addition to Inks 1-18 above, other inks are provided using the amounts in Table III below. The amounts in Table III refer to the wt. % of each component of the identified ink, based on the total weight of the ink.

TABLE III

Ink Components.

| Monofunctional | Difunctional | Rubber | PI | Stab. | VMA | Colorant |
|---|---|---|---|---|---|---|
| 65-90 | 1-12 | 1-20 | 0.5-2.5 | 0.2-2 | — | 0.01-2 |
| 65-85 | 1-10 | 1-15 | 1-2 | 0.2-1.5 | — | 0.1-2 |
| 70-90 | 3-10 | 1-12 | 0.5-3 | 0.2-1 | — | 0.1-1 |
| 75-90 | 3-7 | 1-10 | 1-5 | 0.5-2.5 | 1-10 | 0.1-0.5 |
| 80-90 | 4-12 | 1-5 | 0.1-3 | 0.5-5 | 1-7 | 0.1-1.5 |
| 70-90 | 4-10 | 3-12 | 0.1-2 | 1-5 | — | 0.005-2 |
| 70-85 | 2-9 | 3-10 | 0.1-1 | 1-2 | 1-5 | 0.01-1.5 |
| 75-85 | 2-8 | 5-15 | 0.5-1.5 | 0.5-2 | 1-10 | 0.01-1 |
| 80-90 | 3-10 | 5-10 | 1-2 | 1.5-2 | — | 0.01-0.5 |
| 75-90 | 3-9 | | | 0.5-1.5 | 1-7 | 0.5-1.5 |

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of printing a three-dimensional article comprising:
   selectively depositing layers of a build material in a fluid state onto a substrate to form the three-dimensional article, wherein the build material comprises
   up to 90 wt. % monofunctional curable material;
   up to 10 wt. % difunctional curable material; and
   up to 15 wt. % liquid rubber, based on the total weight of the build material,
   wherein the liquid rubber comprises one or more curable moieties that react with at least one of the monofunctional curable material and the difunctional curable material.

2. The method of claim 1, wherein the monofunctional curable material comprises one or more species of (meth)acrylates.

3. The method of claim 1, wherein the monofunctional curable material is present in the build material in an amount of 70-90 wt. %, based on the total weight of the build material.

4. The method of claim 1, wherein the difunctional curable material comprises one or more species of (meth)acrylates.

5. The method of claim 1, wherein the difunctional curable material is present in the build material in an amount of 3-7 wt. %, based on the total weight of the build material.

6. The method of claim 1, wherein the liquid rubber comprises one or more ethyleneically unsaturated moieties for reaction with the at least one of the monofunctional curable material and the difunctional curable material.

7. The method of claim 1, wherein the liquid rubber comprises a butadiene acrylonitrile copolymer.

8. The method of claim 7, wherein the butadiene acrylonitrile copolymer has an acrylonitrile content of 18-26%.

9. The method of claim 7, wherein the butadiene acrylonitrile copolymer is carboxylic acid terminated, amine terminated, vinyl terminated, or (meth)acrylate terminated.

10. The method of claim 1, wherein the liquid rubber is present in the build material in an amount of 1-5 wt. %, based on the total weight of the build material.

11. The method of claim 1, wherein the build material further comprises a colorant.

12. The method of claim 1, wherein the build material further comprises one or more additives selected from the group consisting of photoinitiators, inhibitors, stabilizing agents, sensitizers, and combinations thereof.

13. The method of claim 1, wherein the build material when cured has a Shore A hardness of 20-40 and an elongation at break of 300-800%.

14. The method of claim 1, wherein at least one of the layers of build material has a thickness of 10 μm to 100 μm.

15. The method of claim 1, wherein the build material is deposited according to preselected computer aided design (CAD) parameters.

16. The method of claim 15, wherein the three-dimensional article has a feature resolution between 50 μm and 500 μm.

17. The method of claim 1 further comprising supporting at least one of the layers of the build material with a support material.

18. The method of claim 1 further comprising curing one or more of the deposited layers of the build material by subjecting the one or more deposited layers to electromagnetic radiation of sufficient wavelength and intensity to cure the build material.

19. The method of claim 18 further comprising planarizing one or more of the layers of build material prior to curing or after curing.

* * * * *